United States Patent
Sergyeyenko et al.

(10) Patent No.: US 12,201,242 B2
(45) Date of Patent: Jan. 21, 2025

(54) MODULAR HAND-HELD KITCHEN APPLICANCE

(71) Applicant: Black & Decker, Inc., New Britain, CT (US)

(72) Inventors: Oleksiy Sergyeyenko, Baldwin, MD (US); Thomas Landis, Baltimore, MD (US)

(73) Assignee: BLACK & DECKER, INC., New Britain, CT (US)

( * ) Notice: Subject to any disclaimer, the term of this patent is extended or adjusted under 35 U.S.C. 154(b) by 575 days.

(21) Appl. No.: 17/182,600

(22) Filed: Feb. 23, 2021

(65) Prior Publication Data
US 2022/0240721 A1    Aug. 4, 2022

Related U.S. Application Data

(63) Continuation-in-part of application No. 17/167,150, filed on Feb. 4, 2021.

(51) Int. Cl.
| | |
|---|---|
| *A47J 43/26* | (2006.01) |
| *A47J 42/26* | (2006.01) |
| *A47J 42/28* | (2006.01) |
| *A47J 42/56* | (2006.01) |

(52) U.S. Cl.
CPC ............. *A47J 42/56* (2013.01); *A47J 42/26* (2013.01); *A47J 42/28* (2013.01)

(58) Field of Classification Search
CPC .. A47J 42/56; A47J 42/26; A47J 42/28; A47J 42/0766; A47J 42/04; A47J 2043/04427
See application file for complete search history.

(56) References Cited

U.S. PATENT DOCUMENTS

| | | | |
|---|---|---|---|
| 2,494,616 A | 1/1950 | Hensel | |
| 3,827,641 A | 8/1974 | Andersson | |
| 4,297,038 A | 10/1981 | Falkenbach | |
| 4,634,061 A * | 1/1987 | Williams | A47J 42/10 241/257.1 |
| 4,637,283 A | 1/1987 | Bertram et al. | |
| 4,702,007 A | 10/1987 | Nomura et al. | |

(Continued)

FOREIGN PATENT DOCUMENTS

| | | |
|---|---|---|
| CA | 931373 A | 8/1973 |
| CN | 201441302 U | 4/2010 |

(Continued)

OTHER PUBLICATIONS

Extended EP Search Report, dated Aug. 22, 2022, for related EP application No. 22153818.4-1016/4049564.

(Continued)

*Primary Examiner* — Faye Francis
(74) *Attorney, Agent, or Firm* — Caeden Curtis Drayton

(57) ABSTRACT

The present invention is directed to a hand-held modular kitchen multitool having a universal powerhead capable of being used with a variety of kitchen appliance attachments, such as a can opener and a coffee grinder. The can opener is a side cutting can opener which provides a more compact size and smoother cut. The coffee grinder has a rotating blade that's only operational when enclosed by a cup and assembled with the powerhead. This prevents unintentional operation and injury to the user.

14 Claims, 10 Drawing Sheets

(56) References Cited

U.S. PATENT DOCUMENTS

Figure 2:
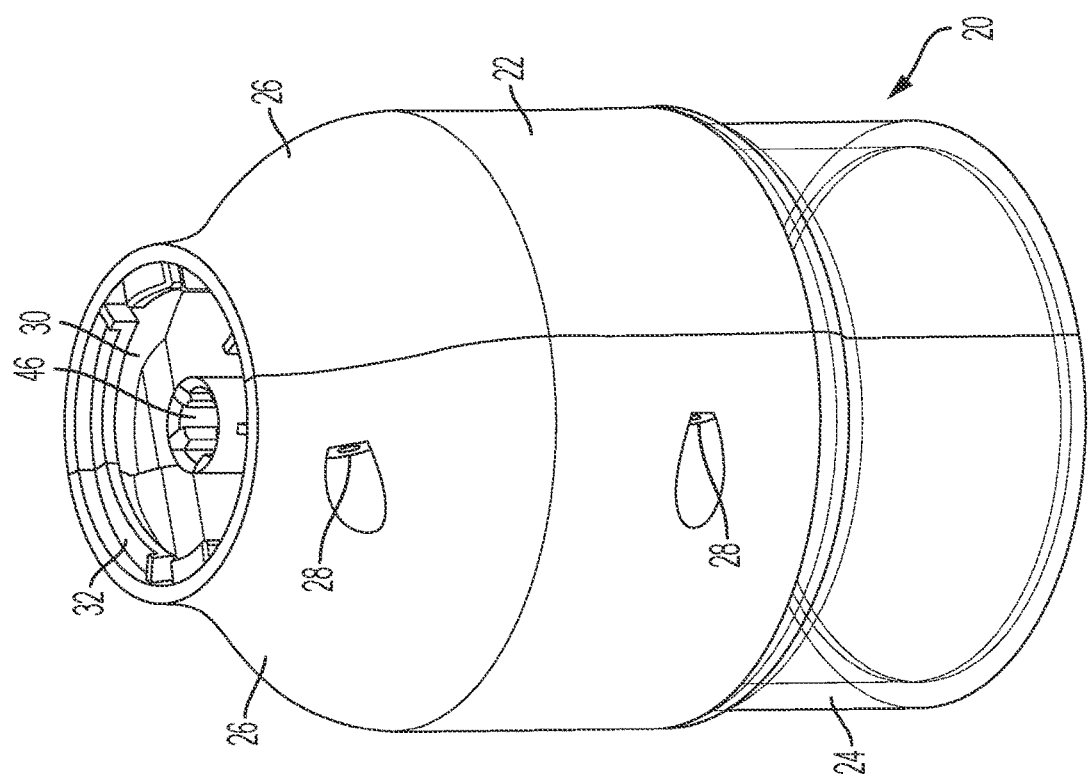

| | | | |
|---|---|---|---|
| 4,709,865 A | 12/1987 | Bounds | |
| 4,734,985 A | 4/1988 | Ozaki | |
| 4,844,352 A | 7/1989 | Griffin | |
| 4,925,150 A | 5/1990 | Tedioli | |
| 5,079,975 A | 1/1992 | Spencer, Jr. | |
| 5,088,652 A | 2/1992 | Chen | |
| 5,095,778 A | 3/1992 | Bocsi et al. | |
| 5,351,579 A | 10/1994 | Metz et al. | |
| 5,724,869 A | 3/1998 | May | |
| 6,035,771 A | 3/2000 | Conran et al. | |
| 6,189,221 B1 | 2/2001 | Barrow et al. | |
| 6,196,086 B1 | 3/2001 | Gort-Barten | |
| 6,516,524 B1 | 2/2003 | Brady | |
| 6,715,706 B1* | 4/2004 | Planca | A47J 43/0766 |
| | | | 241/37.5 |
| 6,719,450 B2* | 4/2004 | Glucksman | B01F 27/13 |
| | | | 366/601 |
| 6,752,041 B2 | 6/2004 | Lee | |
| 6,789,933 B2* | 9/2004 | Gili | A47J 43/0705 |
| | | | 366/331 |
| 6,811,298 B2 | 11/2004 | Peñaranda et al. | |
| 6,962,302 B2 | 11/2005 | Cheng | |
| 7,213,340 B1 | 5/2007 | Lee | |
| 7,371,003 B2* | 5/2008 | Hamelin | A47J 43/0711 |
| | | | 366/129 |
| 7,380,737 B2 | 6/2008 | Wang | |
| 7,461,967 B2* | 12/2008 | Garcia | A47J 43/082 |
| | | | 403/322.2 |
| 7,533,838 B2 | 5/2009 | Kalogroulis et al. | |
| 7,637,447 B2 | 12/2009 | Tang | |
| 7,708,220 B1 | 5/2010 | Tang | |
| 7,975,946 B2 | 7/2011 | Bodum | |
| 7,993,054 B2 | 8/2011 | Wulf et al. | |
| 8,157,435 B2 | 4/2012 | Pryor, Jr. | |
| 8,578,819 B2 | 11/2013 | Cheung | |
| 8,672,533 B2 | 3/2014 | Reyes et al. | |
| 8,757,287 B2 | 6/2014 | Mak et al. | |
| 8,757,529 B2 | 6/2014 | Tang | |
| 8,955,227 B2 | 2/2015 | Lee | |
| 9,101,248 B2 | 8/2015 | Fevre et al. | |
| 9,138,102 B2* | 9/2015 | Rosenwirth | A47J 43/082 |
| 9,149,065 B2 | 10/2015 | Hoare et al. | |
| 9,261,168 B2 | 2/2016 | Yang | |
| 9,272,890 B2 | 3/2016 | Lawlor et al. | |
| 9,352,947 B2 | 5/2016 | Mah et al. | |
| 9,516,975 B2 | 12/2016 | Wong | |
| 9,572,457 B2* | 2/2017 | Ryan | A47J 43/044 |
| 9,591,949 B2 | 3/2017 | Merl | |
| 9,603,490 B2 | 3/2017 | Cheung et al. | |
| 9,630,825 B1 | 4/2017 | Lee | |
| 9,637,367 B1 | 5/2017 | Arnold | |
| 9,688,522 B2 | 6/2017 | Song | |
| 9,693,657 B2 | 7/2017 | Naden et al. | |
| 9,968,222 B2 | 5/2018 | Audette et al. | |
| 10,111,558 B2 | 10/2018 | Dickson, Jr. et al. | |
| 10,173,188 B2* | 1/2019 | Cheung | B01F 35/6052 |
| 10,328,562 B2 | 6/2019 | Benson et al. | |
| 10,455,966 B2* | 10/2019 | Thomas | A47J 43/044 |
| 2002/0178867 A1 | 12/2002 | Lun | |
| 2003/0071150 A1 | 4/2003 | Ruttimann | |
| 2003/0217621 A1 | 11/2003 | Su | |
| 2004/0083783 A1 | 5/2004 | Brandalise | |
| 2005/0235501 A1 | 10/2005 | So | |
| 2008/0098901 A1* | 5/2008 | Lee | A47J 42/56 |
| | | | 99/286 |
| 2009/0314867 A1 | 12/2009 | Bodum | |
| 2012/0241543 A1 | 9/2012 | Tang | |
| 2013/0202401 A1 | 8/2013 | Taitler | |
| 2014/0123813 A1 | 5/2014 | Leung | |
| 2014/0203127 A1 | 7/2014 | Merl | |
| 2015/0060519 A1 | 3/2015 | Shelton, IV et al. | |
| 2015/0146497 A1 | 5/2015 | Brenna | |
| 2015/0164279 A1 | 6/2015 | Ryan | |
| 2015/0297033 A1 | 10/2015 | Wong | |
| 2016/0128514 A1 | 5/2016 | Merl et al. | |
| 2016/0220068 A1 | 8/2016 | Naden et al. | |
| 2018/0178367 A1* | 6/2018 | Benson | A47J 43/044 |
| 2018/0215599 A1 | 8/2018 | Mills | |
| 2018/0303288 A1* | 10/2018 | Mazzer | A47J 42/56 |
| 2020/0179886 A1* | 6/2020 | Atinaja | A47J 43/044 |
| 2021/0251429 A1 | 8/2021 | Eissengarthen et al. | |

FOREIGN PATENT DOCUMENTS

| | | | |
|---|---|---|---|
| CN | 202880808 U | 4/2013 | |
| DE | 3225591 C1 | 10/1983 | |
| DE | 202005000438 U1 | 10/2005 | |
| DE | 202007007947 U1 | 11/2007 | |
| DE | 202012006296 U1 | 8/2012 | |
| DE | 202014005136 U1 | 8/2014 | |
| DE | 102014204262 B4 | 9/2015 | |
| EP | 0956797 A1 | 11/1999 | |
| EP | 1086925 A1 | 3/2001 | |
| EP | 1707091 A1 | 10/2006 | |
| EP | 1529473 B1 | 5/2007 | |
| EP | 2193734 A1 | 6/2010 | |
| EP | 2116162 B1 | 6/2012 | |
| EP | 2394548 B1 | 11/2013 | |
| EP | 2465396 B1 | 12/2014 | |
| EP | 1806080 B1 | 1/2015 | |
| EP | 2623001 B1 | 7/2015 | |
| EP | 3116362 B1 | 7/2017 | |
| EP | 2962609 B1 | 2/2019 | |
| EP | 3005918 B1 | 5/2019 | |
| EP | 3563736 A1 | 11/2019 | |
| EP | 3138450 B1 | 12/2019 | |
| EP | 3338604 B1 | 2/2020 | |
| FR | 2953208 B1 | 6/2011 | |
| GB | 2348638 B | 2/2001 | |
| GB | 2414381 A | 11/2005 | |
| GB | 2455518 A | 6/2009 | |
| KR | 20080000784 A | 1/2008 | |
| KR | 20170033818 A | 3/2017 | |
| KR | 20200007749 A | 1/2020 | |
| WO | 2000024302 A1 | 5/2000 | |
| WO | 2000028870 A2 | 5/2000 | |
| WO | WO2005/030022 * | 7/2005 | A47J 42/26 |
| WO | 2014124859 A1 | 8/2014 | |
| WO | 2016007997 A1 | 1/2016 | |
| WO | 2016172836 A1 | 11/2016 | |
| WO | 2017018624 A1 | 2/2017 | |

OTHER PUBLICATIONS

Partial European Search Report, dated Jul. 15, 2022, for related EP Application No. 22153817.6-1016.

Communication pursuant to Article 94(3) EPC, EP Application No. 22153818.4, Jun. 26, 2023, 4 pages, EPO.

International Search Report and Written Opinion, PCT Application No. PCT/US2023/073610, Feb. 16, 2024, 10 pages, USPTO.

* cited by examiner

MODULAR HAND-HELD KITCHEN APPLICANCE

CROSS-REFERENCE TO RELATED APPLICATION

This application is a continuation-in-part of U.S. Ser. No. 17/167,150, filed Feb. 4, 2021, the disclosure of which are incorporated herein by reference in their entirety.

FIELD OF THE INVENTION

This application is directed to a system of hand-held kitchen appliances having a single powerhead capable of being attached to a variety of kitchen appliance attachments. Examples of such attachments included in the present invention are a can opener and a coffee grinder.

BACKGROUND OF THE INVENTION

This section provides background information related to the present disclosure which is not necessarily prior art.

Modular hand-held kitchen appliances are known in the art. These products typically include a universal powerhead that can be used with different attachments. The powerhead and exemplary attachments, such as a grinder and wine opener, are described in application Ser. No. 17/167,150, from which this application claims priority. However, with additional attachments, the benefit of the system becomes more compelling by providing an alternative to buying multiple bulky and expensive appliances.

BRIEF SUMMARY OF THE INVENTION

Therefore, a modular kitchen appliance of the present invention aims to provide a powered solution for a wide variety of kitchen tasks. These attachments can go beyond mixing and blending and extend to other areas of the kitchen where a powered solution would be beneficial. The present invention is directed to two such areas, coffee grinding and can opening.

In accordance with one aspect of the invention, a coffee grinder is attachable to the powerhead and has a spinning blade that grinds coffee beans. The grinder includes a safety feature that prevents the blade from being operational when exposed to a user. The blade can only be powered when the cup holding the coffee beans is placed over the blade and the combination of the cup and blade assembly is connected to the drive shaft of the powerhead motor. This greatly reduces the likelihood of injury to the user.

In another aspect of the invention, a can opener attachment is disclosed that is capable of use with the powerhead. The can opener is a side cutting unit that slices through the side of the can just underneath the lip of the lid. This type of can opener provides a smoother cut, reducing the jagged edges often found in top cutting can openers.

Further areas of applicability will become apparent from the description provided herein. The description and specific examples in this application are intended for purposes of illustration only and are not intended to limit the scope of the present disclosure.

BRIEF DESCRIPTION OF THE INVENTION

Figure 1:
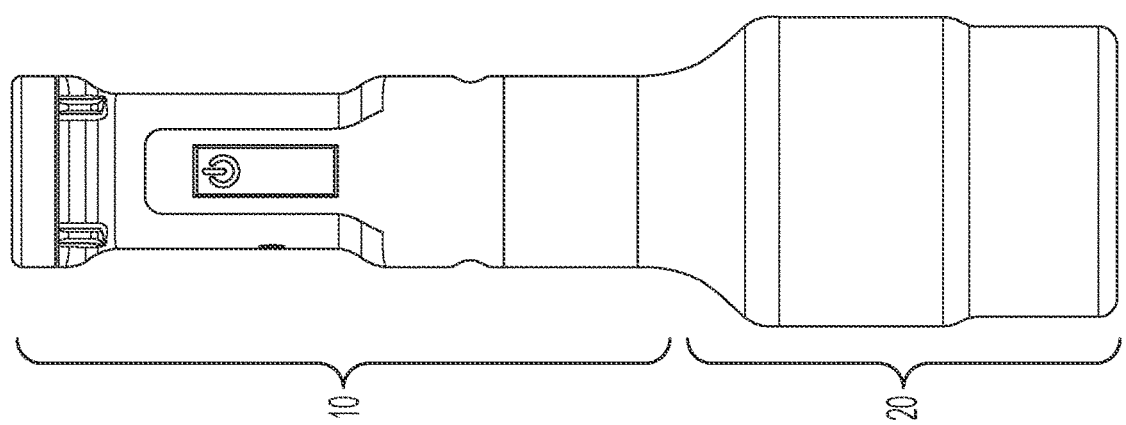
Figure 3:
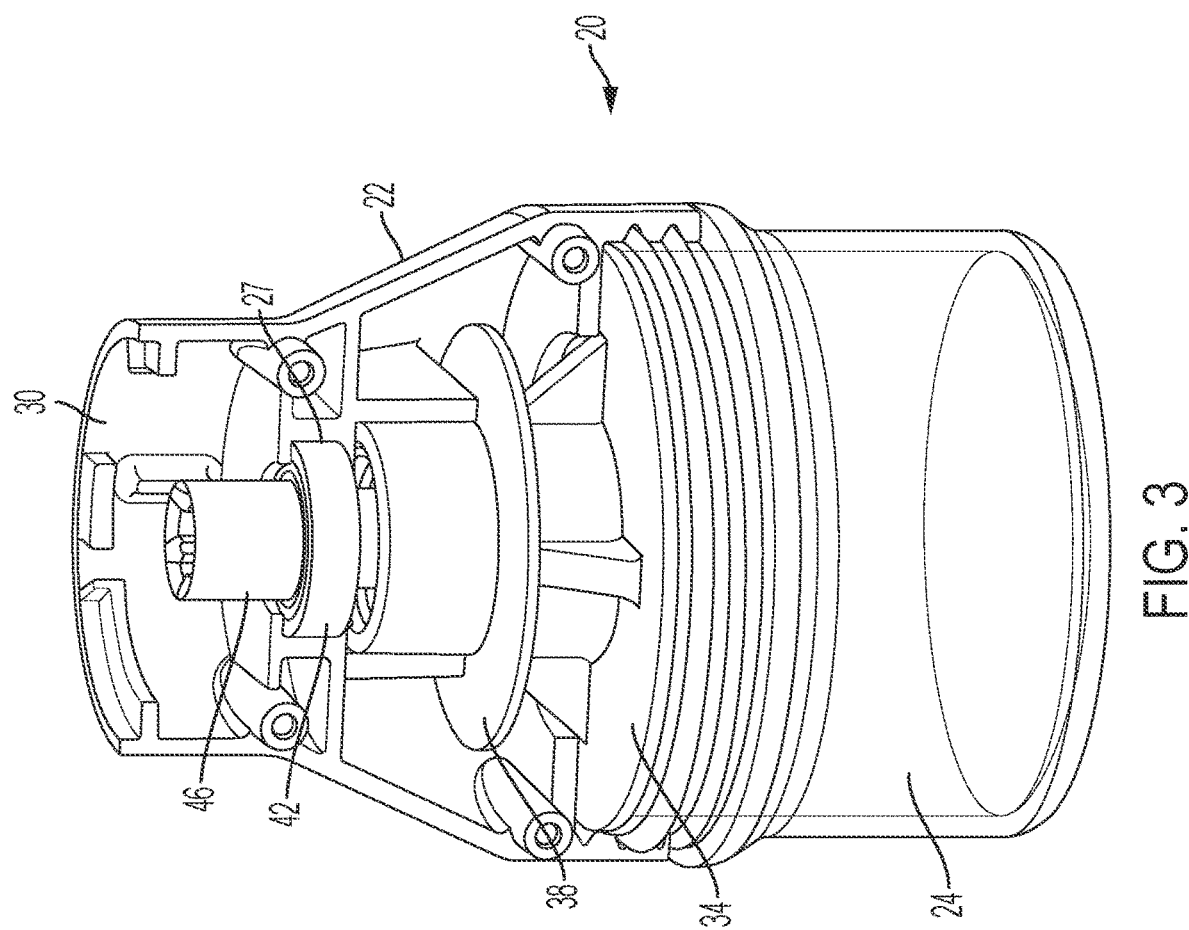
Figure 4:
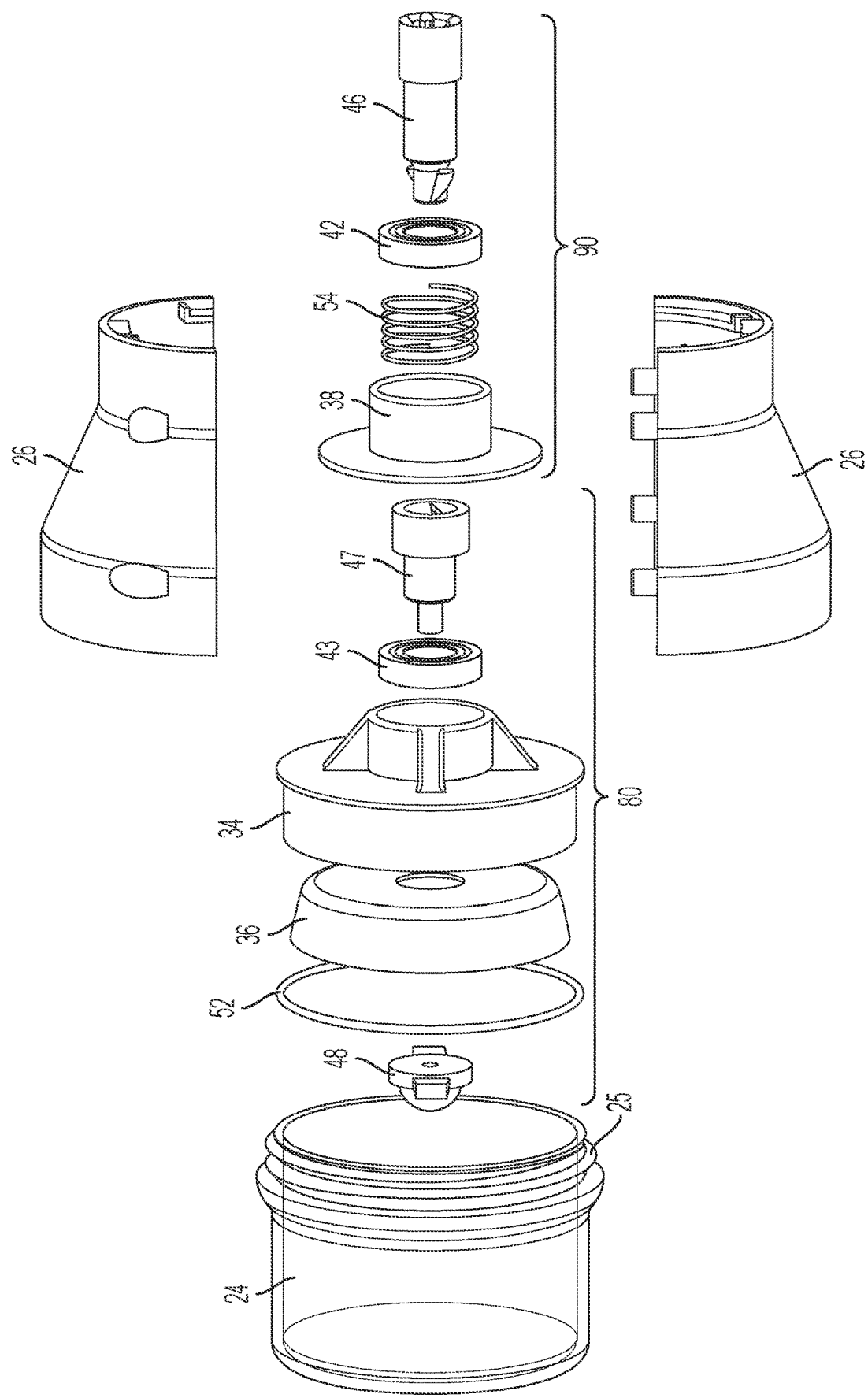
Figure 5:
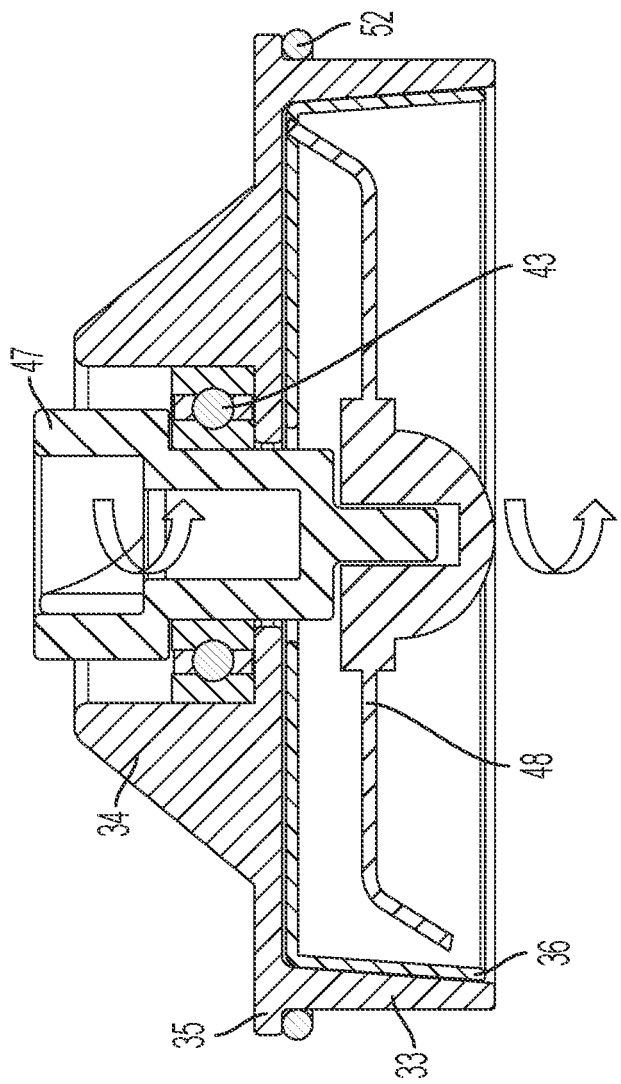
Figure 7:
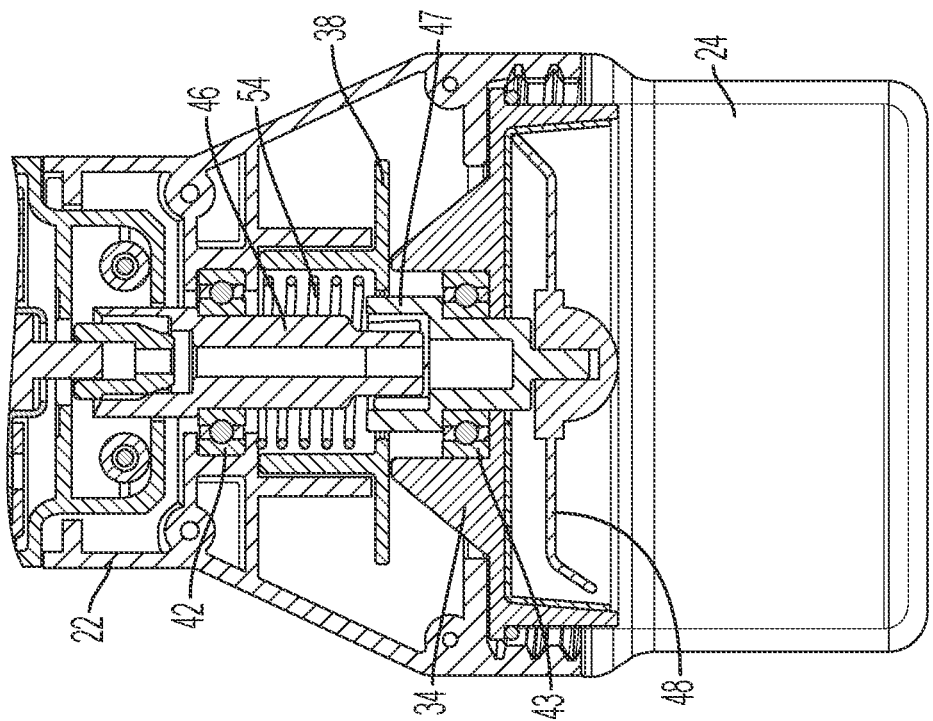
Figure 6:
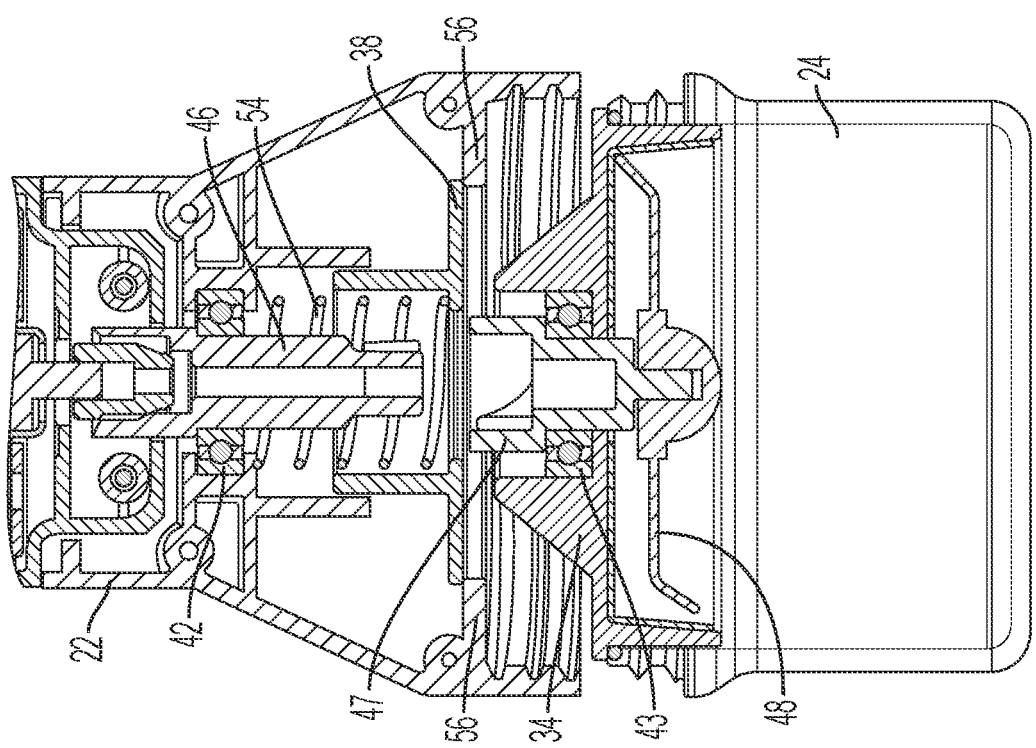
Figure 10:
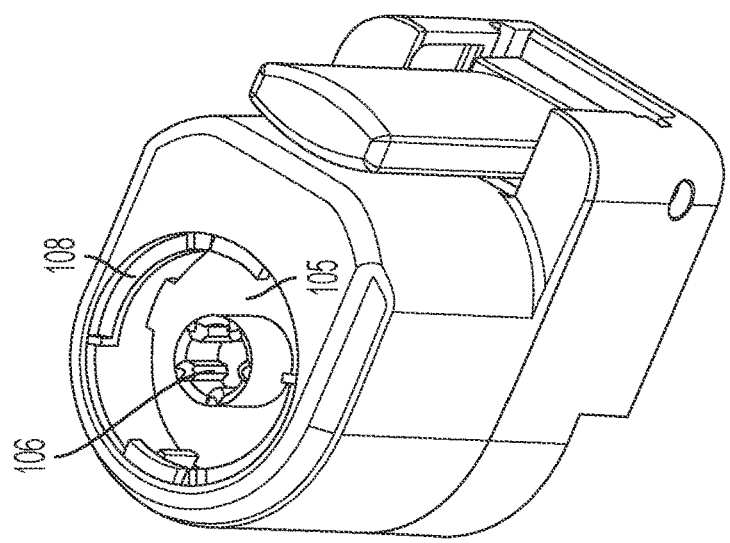
Figure 9:
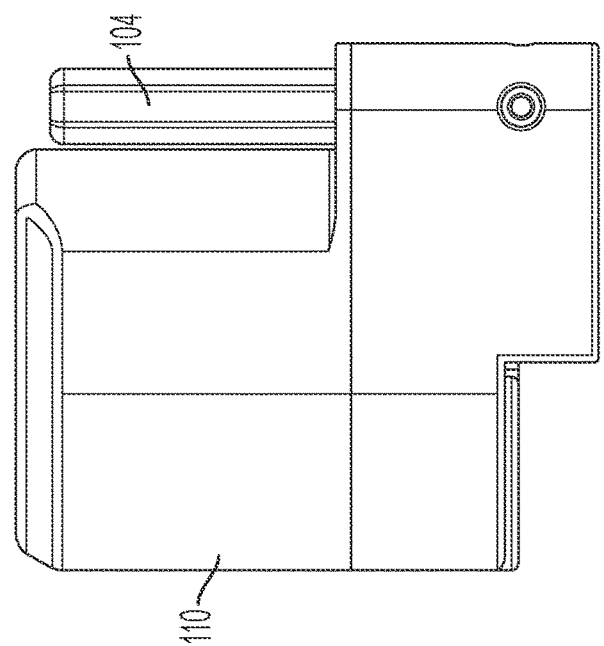
Figure 8:
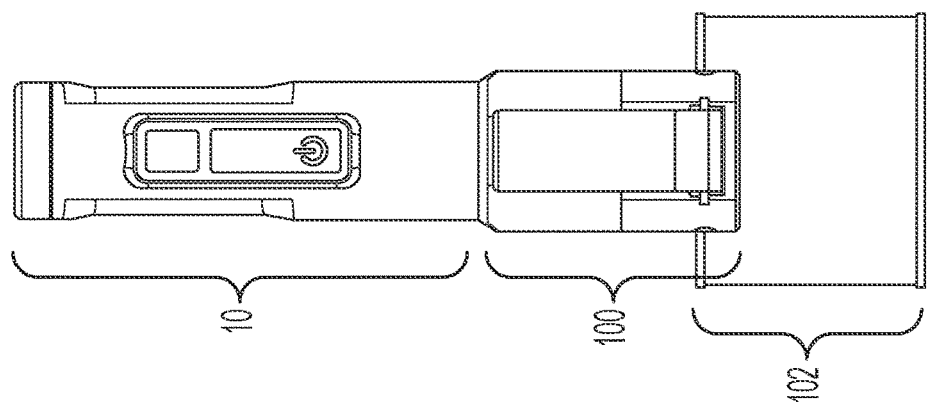
Figure 11:
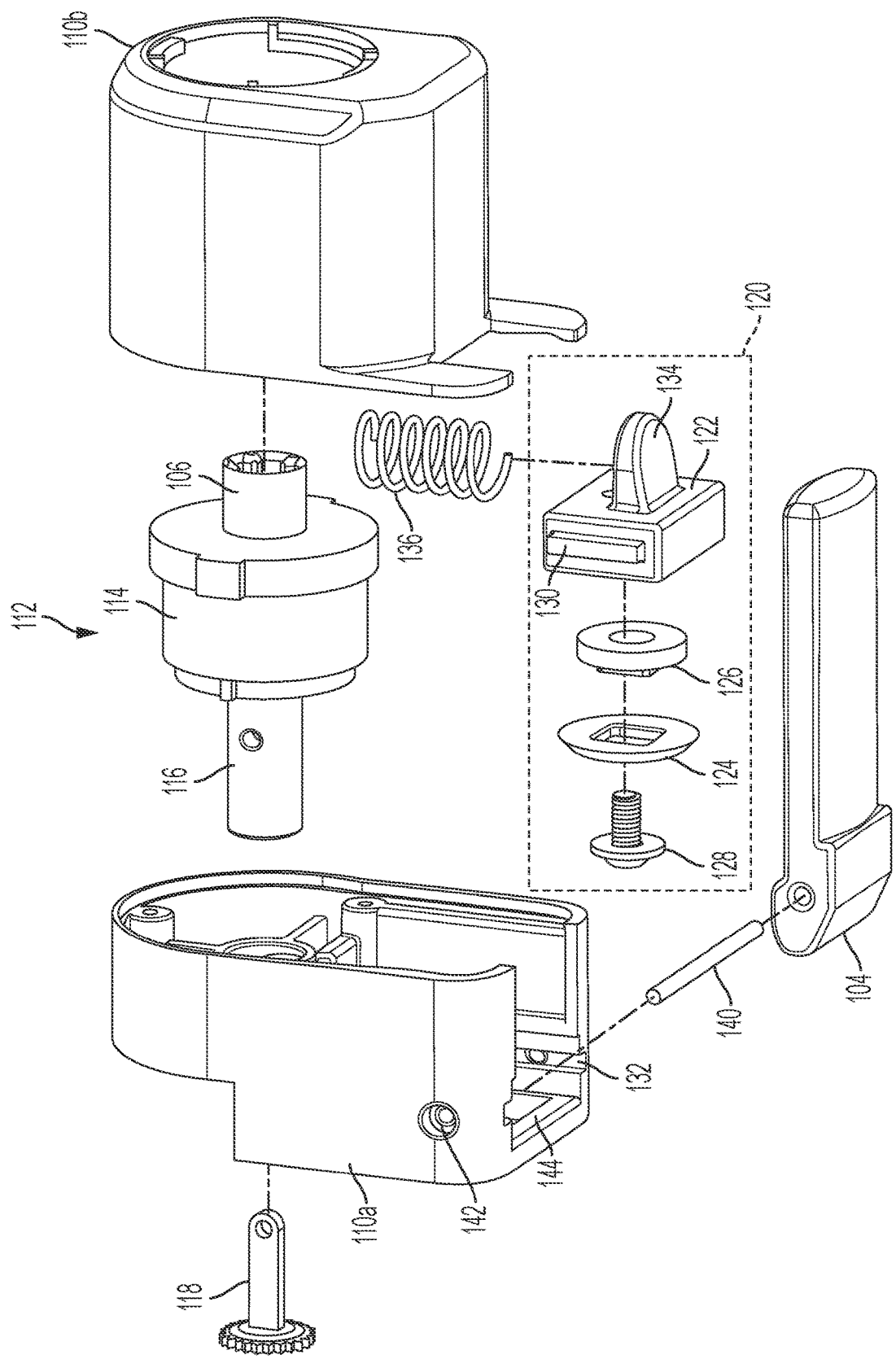
Figure 12:
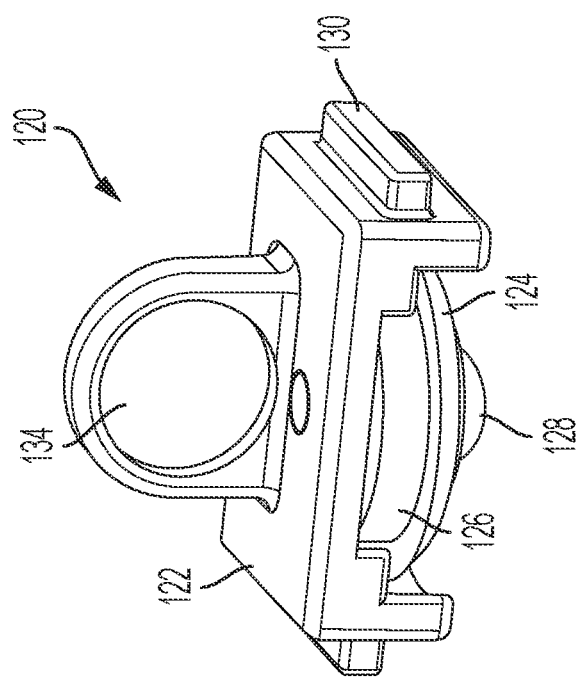
Figure 14:
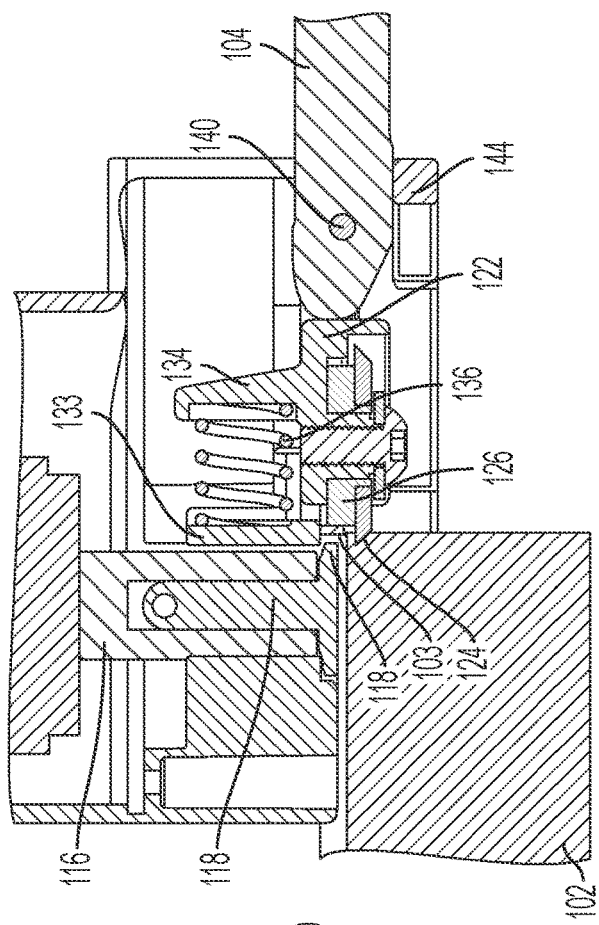
Figure 13:
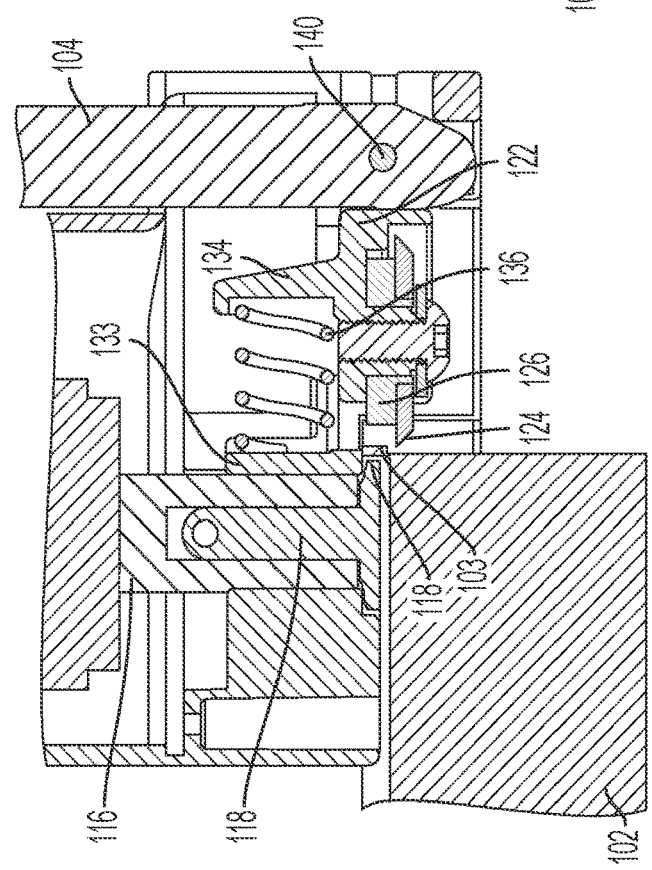
Figure 16:
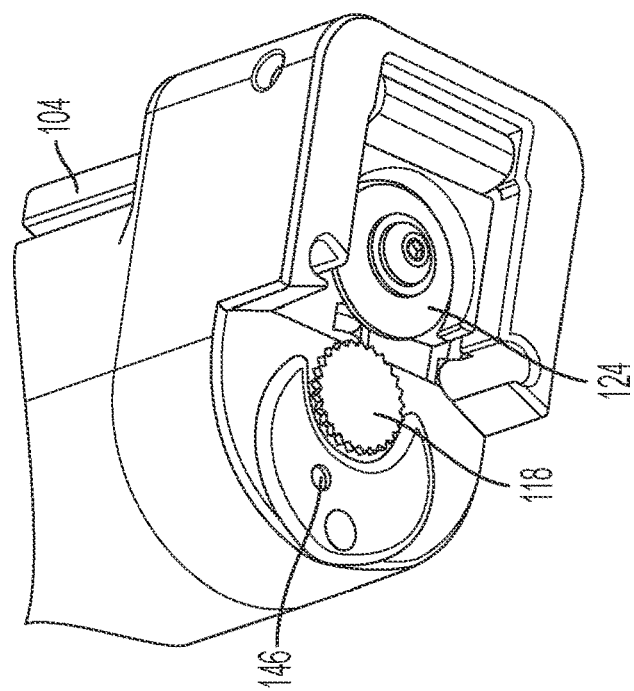
Figure 15:
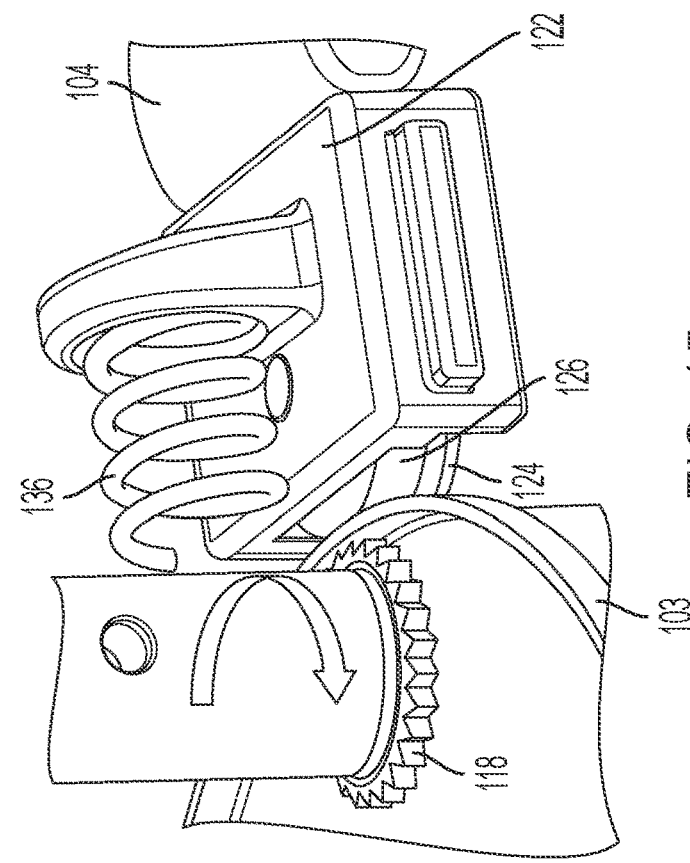

Further features and advantages of the present invention will be better understood by reference to the following description, which is given by way of example and in association with the accompanying drawings, in which:

FIG. 1 shows a powerhead and grinder attachment;
FIG. 2 is the grinder attachment of FIG. 1;
FIG. 3 is a view of FIG. 2, with a portion of the housing removed;
FIG. 4 is an exploded view of the components of the grinder;
FIG. 5 is a section view of the blade assembly;
FIG. 6 is a section view of the grinder attachment disengaged from the powerhead;
FIG. 7 is a section view of the grinder attachment engaged with the powerhead;
FIG. 8 is the powerhead with a can opener attachment and a can;
FIG. 9 is a side view of the can opener attachment;
FIG. 10 is a top view of the can opener attachment;
FIG. 11 is an exploded view of the can opener attachment;
FIG. 12 is a blade assembly;
FIG. 13 is a side section view of the can opener attachment in the disengaged position;
FIG. 14 is a side section view of the can opener attachment in the engaged position;
FIG. 15 shows the blade assembly during the cutting operation; and
FIG. 16 is a bottom view of the can opener attachment.

DETAILED DESCRIPTION OF THE INVENTION

FIG. 1 shows a modular kitchen appliance of the present invention having a universal powerhead 10 and a coffee grinder attachment 20. Although the grinder 10 is described as a coffee grinder, it should be understood that any beans, nuts, spices or other materials may be ground by the present invention.

FIG. 2 shows the grinder attachment 20 having a housing 22 and a cup 24. The housing 22 is made up of two clamshell portions 26 that are held together by screws 28. The top of the housing forms an opening 30 including ribs 32 for connection to the powerhead. The grinder attachment 20 is attached to the powerhead 10 as described in appl. no. 17/167,150.

FIG. 3 shows the coffee grinder with one of the clamshells 26 removed to show the internal components, and FIG. 4 is an exploded view of the components. The grinder consists of two assemblies, a blade assembly 80 and a power transmission assembly 90.

The power transmission assembly 90 will be described first. It delivers power from the powerhead 10 to the blade 48 and includes a power coupling 46 that connects to an output or drive shaft in the power head 10. A bearing 42 is secured in a groove 27 (see FIG. 3) in clamshell housing 26 and holds the power coupling 46. A plate 38 is slidable along the power coupling 46, with a spring 54 (not shown in FIG. 3) held between the plate 38 and housing 22.

Next is the blade assembly 80, which is also shown in FIG. 5. The blade assembly comprises a transmission axle 47 that detachably connects to the power coupling 46. The transmission axle 47 is secured by bearing 43 which is pressed fit into blade cover 34. A blade 48 is fixedly connected to the transmission axle 47. An optional liner 36 is placed on the inside of the blade cover 34, and can be included to help protect the blade cover 34 from wear during grinding. In one embodiment, the liner 36 is made of a metal material, while the cover 34 is made of a plastic material. The blade cover 34 includes a circular perimeter wall 33 that encloses the blade 48 and includes a shelf 35 that extends out from the wall 33. A gasket 52 is placed in the corner of the wall 33 and shelf 35 to provide a seal when attached to cup 24.

To operate the grinder 20, the cup 24 is filled with beans or other material and is slidingly slipped onto the blade cover 34. The cup 24 is shown friction fit onto the blade cover's wall 33, but other attachments method between the cup and blade cover are envisioned within the scope of the invention. An example of an alternate attachment method is a simple twist and lock feature.

With the cup 24 attached to the blade cover 34 (and consequently, the blade assembly 80), it can be screwed onto the housing 22. The cup includes a top rim portion 25 whose exterior is threaded, and the threads correspond with threads on an interior surface of the housing 22.

Referring to FIGS. 6 and 7, the blade assembly 80 is secured on top of the cup 24 as the combined cup 24 and blade assembly 80 are screwed onto the housing 22. As the blade cover 34 moves upward within the housing 22, it pushes against plate 38, which is biased by spring 54, until the transmission axle 47 engages with the power coupling 46. Power can now be delivered to the blade 48, and the grinder is now operational as shown in FIG. 7.

It is noted that although the current design shows the blade assembly 80 as a separate piece that's assembled with the cup 24, an alternative embodiment envisions the blade assembly 80 could be captured within the housing 22, so that securing it to the cup 24 before attachment to the housing 22 is unnecessary.

In any case, the powerhead 10 can now be turned on and the grinder 20 turned upside down so that any material in the cup 24 will be cut by the rotating blade 48. After grinding is finished, the process is reversed and the grinder 20 is flipped right side up, and the cup 24 and blade assembly 80 are unscrewed from the housing 22. As this is happening though, the spring 54 pushes the plate 38 downward until it's stopped by a ledge 56. The ledge 56 retains the plate 38 in the housing 22.

An important function of the plate 38 is to help separate the transmission axle 47 from power coupling 46. In this way, power cannot be transferred to the blade 48 except when the cup 24 is screwed into the housing 22. With the cup 24 unscrewed from the housing 22, the blade assembly 80 can be separated from the cup 24, without any risk of the blade 48 being turned on.

FIG. 8 shows yet another example of a kitchen appliance attachment, in this case a can opener 100, that can be attached to the powerhead 10. A can 102 is shown attached to the can opener 100. FIG. 9 is a side view of the can opener 100, which is comprised of a main housing 110 and a lever 104.

FIG. 10 is a top view of the can opener 100 which shows an opening 105 through which a power coupling 106 extends. The power coupling 106 is releasably attached to a drive shaft of the powerhead 10, which powers the operation of the can opener 100. The opening further includes ribs 108 along its interior edge for securing it to the powerhead 10 as explained in related application no. 17/167,150.

Now turning to FIG. 11, an exploded view of the can opener 100 is shown. The main housing 110 formed from two clamshell portions 110a and 110b. A transmission axle 112 is located in the housing and includes the power coupling 106, a reduction gearbox 114 and an output shaft 116. The output shaft 116 is fixedly connected to feed wheel 118 by a pin (not shown). The reduction gearbox 114 reduces the rotational speed of the drive shaft from the powerhead 10 to a much lower speed for spinning the can as it's being cut.

The housing 110 further encloses a blade assembly 120 that includes a shuttle 122, a blade 124 and a roller 126. A bolt and washer 128 secure the blade 124 and roller 126 to the shuttle 122. FIG. 12 shows the assembled blade assembly 120.

FIGS. 13-14 are sectional views of the blade assembly 120 within the housing 110 in the disengaged and engaged position, respectively. The shuttle 122 includes rails 130 that travel within a groove 132 formed in the housing (see FIG. 11). The shuttle includes an extension 134 that captures one end of a spring 136. The other end of the spring 136 abuts an internal wall 133 of the housing 110, and biases the shuttle 122 outwardly (e.g. to the right in FIGS. 13 and 14).

Now referring to FIG. 13, the blade 124 is shown disengaged from the can 102. The can 102 is placed against feed wheel 118 which engages a lip 103 of can 102. The lever 104 is then pulled down, pushing the shuttle 122 inward so that blade 124 punctures the side of the can 102. The lever 104 is fixed to the housing 110 by a pin 140 through an aperture 142. In the disengaged position, the shuttle 122 abuts a relatively flat side of the lever 104.

FIG. 14 shows the lever 104 after it's been rotated 90 degrees into the engage position, where the end of the lever 104, which is generally oval shaped, pushes the shuttle 122 against the force of the spring 136. The lever is prevented from over-rotating by a ledge 144 in the housing 110 that acts as a stop. When the lever 104 is rotated, it pushes the shuttle 122 so that the blade 124 cuts through the side of the can 102. The lip 103 of the can 102 is pinched between the feed wheel 118 and the roller 126. The powerhead can then be turned on, which rotates the feed wheel 118 and cuts the can. See also FIG. 15.

A magnet 146 can be provided in the housing adjacent the feed wheel 118 (see FIG. 16). The magnet 146 helps retain the can lid after the top of the can 102 has been cut off.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure

The invention claimed is:

1. A modular kitchen appliance, comprising:
   a powerhead having motor with an output shaft;
   a grinder attachment, the grinder attachment having a housing and a power coupling configured to connect to the output shaft;
   a blade assembly releasably connected to the power coupling, the blade assembly having a blade for cutting and a blade cover at least partially enclosing the blade;
   a cup for holding material to be cut, the cup being attachable to the blade assembly; and
   wherein when the cup is attached to the housing, and the cup and blade assembly are attached together, the blade assembly mechanically connects to the power coupling.

2. The modular kitchen appliance according to claim 1, wherein the blade assembly includes a transmission axle and the blade is fixedly connected to the transmission axle, the transmission axle being releasably connected to the power coupling to transfer power to the blade.

3. The modular kitchen appliance according to claim 1, wherein the cup has a threaded portion to allow the cup to be screwed onto a corresponding threaded portion on the housing.

4. A modular kitchen appliance, comprising:
a powerhead having motor with an output shaft;
a grinder attachment, the grinder attachment having a housing and a power coupling configured to connect to the output shaft;
a blade assembly releasably connected to the power coupling, the blade assembly having a blade for cutting;
a cup for holding material to be cut, the cup being attachable to the blade assembly;
wherein the blade is operational only when the cup is attached to the housing;
wherein the blade assembly includes a transmission axle and the blade is fixedly connected to the transmission axle, the transmission axle being releasably connected to the power coupling to transfer power to the blade;
wherein the blade assembly includes a blade cover at least partially enclosing the blade; and
a plate adjacent the blade cover and biasing the blade cover away from the power coupling so that the transmission axle is detached from the power coupling.

5. The modular kitchen appliance according to claim 4, further including a spring located between the plate and the housing for biasing the plate.

6. The modular kitchen appliance according to claim 4 wherein the housing includes a ledge for retaining the plate within the housing.

7. A grinder attachment for a modular kitchen appliance, comprising:
a housing;
a power transmission assembly configured to attach to an output shaft of a powerhead;
a blade assembly releasably connected to the power transmission assembly, the blade assembly having a blade for cutting and a blade cover at least partially enclosing the blade;
a plate adjacent the blade cover and biasing the blade cover away from the power coupling so that the transmission axle is detached from the power coupling;
a cup for holding material to be cut, the cup being attachable to the blade assembly; and
wherein when the cup is attached to housing, the blade is operational and is mechanically connected to the output shaft.

8. The grinder attachment for a modular kitchen appliance according to claim 7, wherein the power transmission assembly includes a power coupling attachable to the output shaft;
the blade assembly includes a transmission axle and the blade is fixedly connected to the transmission axle, the transmission axle being releasably connected to the power coupling to transfer power to the blade.

9. The grinder attachment for a modular kitchen appliance according to claim 8, further including a spring located between a plate and the housing for biasing the plate.

10. The grinder attachment for a modular kitchen appliance according to claim 9, wherein the housing includes a ledge for retaining the plate within the housing.

11. A method for grinding comprising the steps of:
providing a powerhead having motor with an output shaft, and a grinder attachment having a housing, a power coupling configured to connect to the output shaft and a blade assembly, the blade assembly having a blade for cutting and a blade cover at least partially enclosing the blade, a plate adjacent the blade cover and biasing the blade cover away from the power coupling so that the transmission axle is detached from the power coupling;
placing materials to be ground into a cup;
securing the cup to the blade assembly;
attaching the cup to the housing, wherein the blade is operational only after the cup is secured to the housing;
attaching the grinder attachment to the powerhead; and
turning on the powerhead.

12. The method of claim 11, wherein the blade is fixedly connected to a transmission axle and the transmission axle is connected to the power coupling only after the cup is attached to the housing.

13. The method of claim 11 wherein a spring is located between the plate and the housing for biasing the plate.

14. The method of claim 11, wherein the cup has a threaded portion to allow the cup to be screwed onto a corresponding threaded portion on the housing.

* * * * *